S. C. COOPER.
AUTOGRAPHIC ATTACHMENT FOR CAMERAS.
APPLICATION FILED NOV. 23, 1915.
1,222,531.
Patented Apr. 10, 1917.
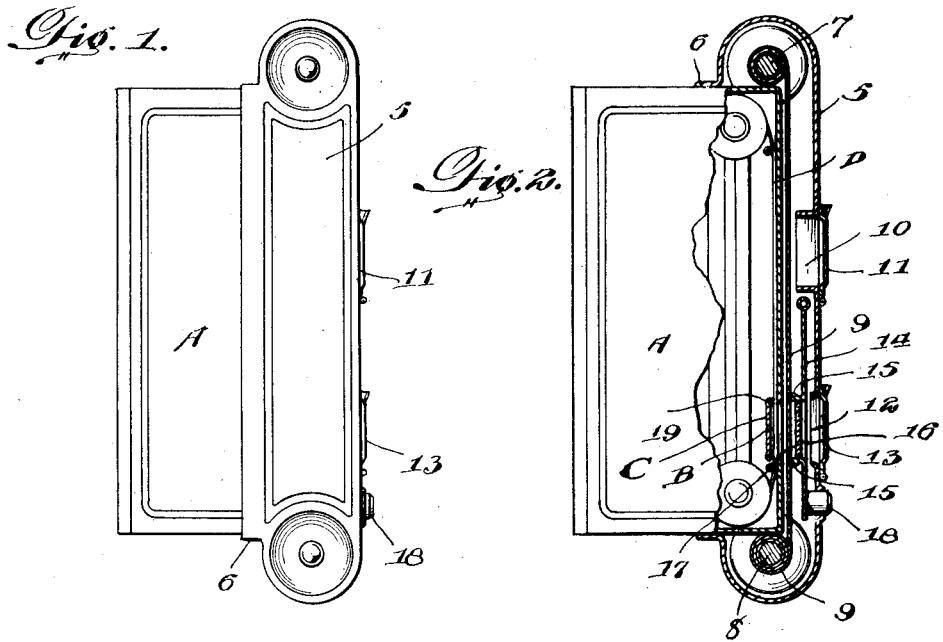
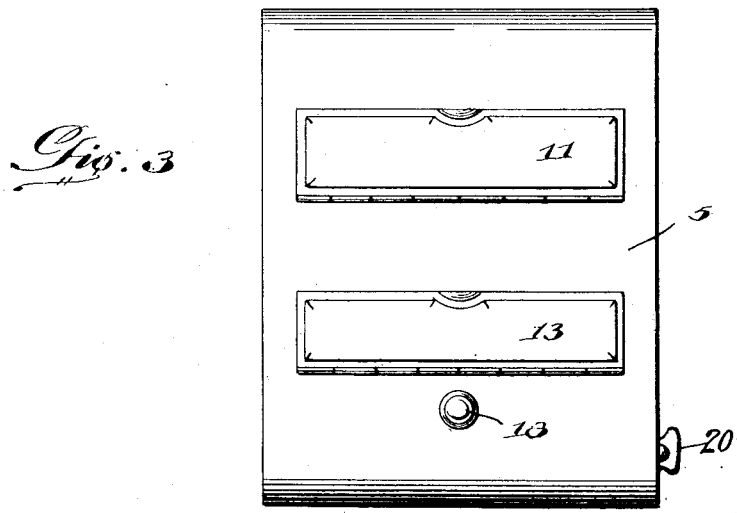
Witnesses
Frederick L. Fox
Inventor
S. C. Cooper.
By Victor J. Evans.
Attorney

UNITED STATES PATENT OFFICE.

SAMUEL C. COOPER, OF NUNDA, NEW YORK.

AUTOGRAPHIC ATTACHMENT FOR CAMERAS.

1,222,531.  Specification of Letters Patent.  Patented Apr. 10, 1917.

Application filed November 23, 1915. Serial No. 63,000.

*To all whom it may concern:*

Be it known that I, SAMUEL C. COOPER, a citizen of the United States, residing at Nunda, in the county of Livingston and State of New York, have invented new and useful Improvements in Autographic Attachments for Cameras, of which the following is a specification.

The invention relates to camera attachments, and more particularly to the class of autographic attachments for use on cameras.

The primary object of the invention is the provision of a camera of this character wherein the construction thereof is novel in form so that inscriptions, titles or other data can be written for the transfer thereof upon the film within the camera.

Another object of the invention is the provision of a camera attachment of this character which can be readily and easily applied to the body of the camera.

A further object of the invention is the provision of an attachment of this character which is simple in construction, light and dust proof, readily and easily attached to and removed from the camera, strong, durable, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—

Figure 1 is a side elevation of a camera with the attachment constructed in accordance with the invention applied.

Fig. 2 is a vertical longitudinal sectional view thereof.

Fig. 3 is a rear elevation.

Similar reference characters indicate corresponding parts throughout the several views in the drawing.

Referring to the drawing in detail, A designates the box or case constituting the body of a folding camera of any ordinary well-known construction, having in its back or rear wall an elongated transversely disposed opening B, while interiorly of the box or case and facing the said opening is a film support C between which and the rear wall or back of the box or case travels the film D which is in roll form, as usual, and mounted in the ordinary manner within the body of the camera. The elongated transversely disposed opening B is formed in the camera by having a countersink made by striking inwardly upon the rear wall of the body or case of the said camera and slotting opposed walls of said countersink as is clearly shown in the drawing.

Telescoped upon the body of the camera at the rear thereof is the attachment comprising a shell 5 formed with a front opening bound by a marginal mouth flange 6 for receiving the rear end of the box or case of the camera, and within this shell 5 at opposite ends are reels 7 and 8, respectively, upon which is alternately wound and unwound a paper strip 9 of the desired length, preferably of yellow tint, which is adapted to be fed between the rear wall of the box or case and the rear wall of the shell 5 so as to move over the opening B in the said rear wall of the box or case of the camera.

Formed in the rear wall of the shell 5 above the opening B in the box or case A is an opening 10 for permitting the insertion of a pencil or crayon for inscribing writing upon the strip 9, and this opening is normally closed by means of a door 11 which is suitably hinged to the shell 5 and can be readily swung to open position when it is desired to inscribe data upon the strip.

Formed in the rear wall of the shell 5 to register with the opening B in the rear wall of the case or box of the camera is an opening 12 which is adapted to be closed by means of a door 13 which is suitably hinged to the shell 5 for the opening and closing thereof for a purpose presently described.

Swingingly supported interiorly of the shell 5 is a presser frame 14 formed with marginal rounded flanges 15 so that on movement of the frame inwardly the strip 9 will be pressed against the rear wall of the box or case A contiguous to the film supported upon the support C interiorly of the box or case, the frame 14 being formed with an opening 16 registering with the openings B and 12 in the rear wall of the camera body and the shell, and this opening 16 has fitted therein a glass panel 17, colored red, so that on the opening of the door 13 the light will penetrate through the glass panel 17 for printing the inscription upon the strip 9 onto the film D interiorly of the camera.

The frame 14 is formed with a push button 18 which extends through the rear wall of the shell 5 without the same so that it can be manually pressed for shifting the frame 14 which has the flanges 15 so as to press the strip 9 close against the opening B in the rear wall of the camera. The marginal edge of the opening B has a rubber covering 19 to prevent the scratching of the film or the tearing of the paper strip 9.

The reel 8 has mounted on the end thereof without the shell 5 a turn knob 20 so that the strip 9 can be wound upon the said reel 8 and from the said reel 7 for the feeding of the strip 9 across the openings 10 in the shell 5 and B in the rear wall of the camera, respectively. The strip 9 is written upon through the opening 10, and this inscribed portion of the strip is fed into registration with the opening B in the camera so that on opening the door 13 the light rays will penetrate through the strip 9 for the printing of the inscription onto the film D within the box or case of the camera for the transfer of the inscription or other data thereon.

The strip 9 can be of the required length so as to serve in receiving a number of inscriptions for the transfer thereof onto the film.

From the foregoing description, taken in connection with the accompanying drawing, the construction and manner of operation of the device will be clearly understood, and therefore a more extended explanation has been omitted.

What is claimed is:—

1. The combination with a camera body having an opening therein, of a support within the camera body for a film when traversing said opening, a shell fitted upon the camera body and having spaced openings, doors on said shell for normally closing said openings, spools arranged in said shell, a translucid inscription receiving strip carried by and adapted to be wound on and unwound from the spools, respectively, and movable across the openings in the shell and camera body, and means within the shell for pressing the strip contiguous to the film within the camera body.

2. The combination with a camera body having an opening therein, of a support within the camera body for a film when traversing said opening, a shell fitted upon the camera body and having spaced openings, doors on said shell for normally closing said openings, spools arranged in said shell, a translucid inscription receiving strip carried by and adapted to be wound on and unwound from the spools, respectively, and movable across the openings in the shell and camera body, means within the shell for pressing the strip contiguous to the film within the camera body, and a colored panel pervious to light carried by the said means and registering with the opening in the camera body.

3. The combination with a camera body having an opening therein, of a support within the camera body for a film when traversing said opening, a shell fitted upon the camera body and having spaced openings, doors on said shell for normally closing said openings, spools arranged in said shell, a translucid inscription receiving strip carried by and adapted to be wound on and unwound from the spools, respectively, and movable across the openings in the shell and camera body, means within the shell for pressing the strip contiguous to the film within the camera body, a colored panel pervious to light carried by the said means and registering with the opening in the camera body, and means for rotating one of the spools.

4. The combination with a camera body having an opening therein, of a support within the camera body for a film when traversing said opening, a shell fitted upon the camera body and having spaced openings, doors on said shell for normally closing said openings, spools arranged in said shell, a translucid inscription receiving strip carried by and adapted to be wound on and unwound from the spools, respectively, and movable across the openings in the shell and camera body, means within the shell for pressing the strip contiguous to the film within the camera body, a colored panel pervious to light carried by the said means and registering with the opening in the camera body, means for rotating one of the spools, and a finger engaging member carried by said means and extended without the shell for access thereto to permit the operation of the same.

In testimony whereof I affix my signature in presence of two witnesses.

SAMUEL C. COOPER.

Witnesses:
B. E. JONES,
H. COHEN.

Copies of this patent may be obtained for five cents each, by addressing the "Commissioner of Patents, Washington, D. C."